United States Patent [19]

Iwatani et al.

[11] Patent Number: 5,144,220
[45] Date of Patent: Sep. 1, 1992

[54] VEHICLE AC GENERATOR CONTROL SYSTEM

[75] Inventors: Shiro Iwatani; Hirofumi Watanabe, both of Hyogo, Japan

[73] Assignee: Mitsubishi Denki K.K., Tokyo, Japan

[21] Appl. No.: 618,431

[22] Filed: Nov. 27, 1990

[30] Foreign Application Priority Data

Nov. 30, 1989 [JP] Japan .................................. 1-313853
Nov. 30, 1989 [JP] Japan .................................. 1-313854

[51] Int. Cl.$^5$ .............................................. H02J 7/14
[52] U.S. Cl. ...................................... 322/28; 322/73; 320/64
[58] Field of Search ..................... 322/73, 28; 320/64

[56] References Cited

U.S. PATENT DOCUMENTS

| 3,602,797 | 8/1971 | Bleher | 322/28 |
|---|---|---|---|
| 3,820,009 | 6/1974 | Itoh et al. | 322/28 |
| 3,904,948 | 9/1975 | Earle | 320/64 |
| 3,984,755 | 10/1976 | Lehnhoff et al. | 322/28 |
| 4,258,307 | 3/1981 | Mori et al. | 322/28 |
| 4,275,344 | 6/1981 | Mori et al. | 322/28 |
| 4,293,811 | 10/1981 | Muto et al. | 322/60 |
| 4,384,245 | 5/1983 | Metter | 322/28 |
| 4,463,305 | 7/1984 | Wineland et al. | 322/10 |
| 4,486,202 | 12/1984 | Edwards | 322/28 |
| 4,555,657 | 11/1985 | Kato et al. | 320/64 |
| 4,616,162 | 10/1986 | Radomski | 318/317 |
| 4,634,954 | 1/1987 | Kato et al. | 322/28 |
| 4,636,705 | 1/1987 | Bowman | 322/28 |
| 4,636,706 | 1/1987 | Bowman et al. | 322/28 |
| 4,651,081 | 3/1987 | Nishimura et al. | 320/64 |
| 4,658,200 | 4/1987 | Kouge | 322/28 |
| 4,665,354 | 5/1987 | Sada et al. | 320/64 |
| 4,670,704 | 6/1987 | Maehara et al. | 322/28 |
| 4,689,545 | 8/1987 | Komurasaki et al. | 322/14 |
| 4,754,212 | 6/1988 | Mashino | 322/28 |
| 4,839,576 | 6/1989 | Kaneyuki et al. | 322/28 |
| 4,910,451 | 3/1990 | Iwatani et al. | 322/28 |
| 4,914,374 | 4/1990 | Iwatani et al. | 322/28 |
| 4,937,514 | 6/1990 | Iwatani | 322/28 |
| 4,940,928 | 7/1990 | Nishimura | 322/73 |

FOREIGN PATENT DOCUMENTS

| 0201243 | 12/1986 | European Pat. Off. | |
|---|---|---|---|
| 0116615 | 9/1979 | Japan | 320/64 |
| 0002397 | 1/1980 | Japan | 322/22 |
| 0002398 | 1/1980 | Japan | 322/22 |
| 0106400 | 7/1982 | Japan | 322/28 |
| 58-66538 | 4/1983 | Japan | |
| 58-175000 | 11/1983 | Japan | |
| 0613474 | 6/1978 | U.S.S.R. | 322/28 |
| 2052189 | 1/1981 | United Kingdom | 320/64 |

Primary Examiner—Steven L. Stephan
Assistant Examiner—Thomas M. Dougherty
Attorney, Agent, or Firm—Sughrue, Mion, Zinn, Macpeak & Seas

[57] ABSTRACT

A control device for a vehicle AC generator provided with a rectifier and a battery connected to the latter comprises a voltage regulator with a switching element connected to the field coil of the generator, to adjust the output voltage of the generator to a predetermined value in which a field current is controlled to eliminate a load torque which otherwise occurs immediately after the start of the engine, to stabilize the rotation of the engine, and to prevent the production of belt slip noises at low temperatures. Further, when the generator output is restored, the production of a belt slip noise is prevented, and the decrease in the speed of rotation of the engine is prevented.

11 Claims, 3 Drawing Sheets

VEHICLE AC GENERATOR CONTROL SYSTEM

BACKGROUND OF THE INVENTION

This invention relates to a vehicle AC generator control system.

A vehicle AC generator is driven through a V-belt by the engine, to convert rotational energy into electrical energy. There has been a demand for provision of a high power vehicle AC generator for an increasing vehicle electrical load. The increase in output of the vehicle AC generator means the increase in load torque of the engine. Hence, the rotation of the engine is liable to become unstable when the explosion and combustion are unstable for instance immediately after the start of the engine. In addition, at the start of the engine, the generator provides its maximum output to charge the battery which has been discharged to operate the starter motor, and accordingly the load on the engine is increased as much; that is, the rotation of the engine becomes more unstable. This phenomenon occurs significantly when the ambient temperature is low.

In order to overcome this difficulty, a control device has been proposed, for instance, by Published Unexamined Japanese Patent Application (OPI) No. 66538/1983 (the term "OPI" as used herein means an "unexamined published application") in which, when the rotation of the engine is unstable immediately after the start, the amount of current supplied to the field coil is limited for a certain period of time to decrease the engine load, thereby to stabilize the engine idling rotation.

The above-described control device controls the field current for a certain period of time from the start of the engine, as was described above. Therefore, the generator output is suppressed, but it will not become zero (A). Hence, with the device, it is difficult to completely eliminate the generator drive load torque; that is, the rotation of engine cannot be sufficiently stabilized.

In general, when it is cold, the V-belt and pulleys for driving a vehicle generator are not sufficiently engaged with one another. Therefore, in the case of the above-described conventional control device, when the generator produces drive torque, the belt slips thus producing noises (hereinafter referred to as "belt slip noises", when applicable).

Furthermore, with the conventional control device, a certain period of time from the start of the engine the field current is abruptly increased, and accordingly the generator output is also abruptly increased; that is, the engine load is abruptly increased, so that the belt slip noise is liable to be produced. In addition, the abrupt increase of the engine load may adversely affect the rotation of the engine.

SUMMARY OF THE INVENTION

Accordingly, an object of this invention is to eliminate the above-described difficulties accompanying a conventional control drive for a vehicle AC generator.

More specifically, an object of the invention is to provide a control device for a vehicle AC generator in which the generator drive load torque is completely eliminated which otherwise occurs immediately after the start of the engine, to stabilize the rotation of the engine, and the production of a belt slip noise is prevented when it is cold, and in which the production of a belt slip noise and the decrease in the speed of rotation of the engine are prevented which otherwise may be caused when the generator output is restored.

The foregoing object and other objects of the invention have been achieved by the provision of a vehicle AC generator control system comprising an AC generator having a field coil, a rectifier for rectifying an AC output of the AC generator, a battery connected to the output terminals of the rectifier and a voltage regulator having a switching element connected in series to the field coil, the voltage regulator detecting the terminal voltage of either the rectifier or battery, to control a field current with the aid of the switching element, to adjust an output voltage of the AC generator to a predetermined value. The voltage regulator operates to adjust the output voltage of the AC generator to a first value lower than a voltage appearing across the battery during a predetermined period of time after the start of power generation of said AC generator and then to a second value higher than the battery output voltage after the predetermined period has elapsed. Alternatively, the voltage regulator operates to control said switching element so as to have a first conduction rate for a predetermined period of time from the start of power generation by said AC generator, and then to control said switching element so as to have a conduction rate gradually increasing from the first conduction rate to a second conduction rate.

With the vehicle AC generator control system according to the invention, the generated voltage is adjusted to a value lower than the battery voltage for the predetermined period of time from the start of power generation, and thereafter to a value higher than the battery voltage so that the usual charge output operation is carried out. The nature, principle and utility of the invention will become more apparent from the following detailed description when read in conjunction with the accompanying drawings.

DETAILED DESCRIPTION OF THE INVENTION

One example of a control device for a vehicle AC generator according to this invention will be described with reference to FIGS. 1 and 2.

Figure 1:
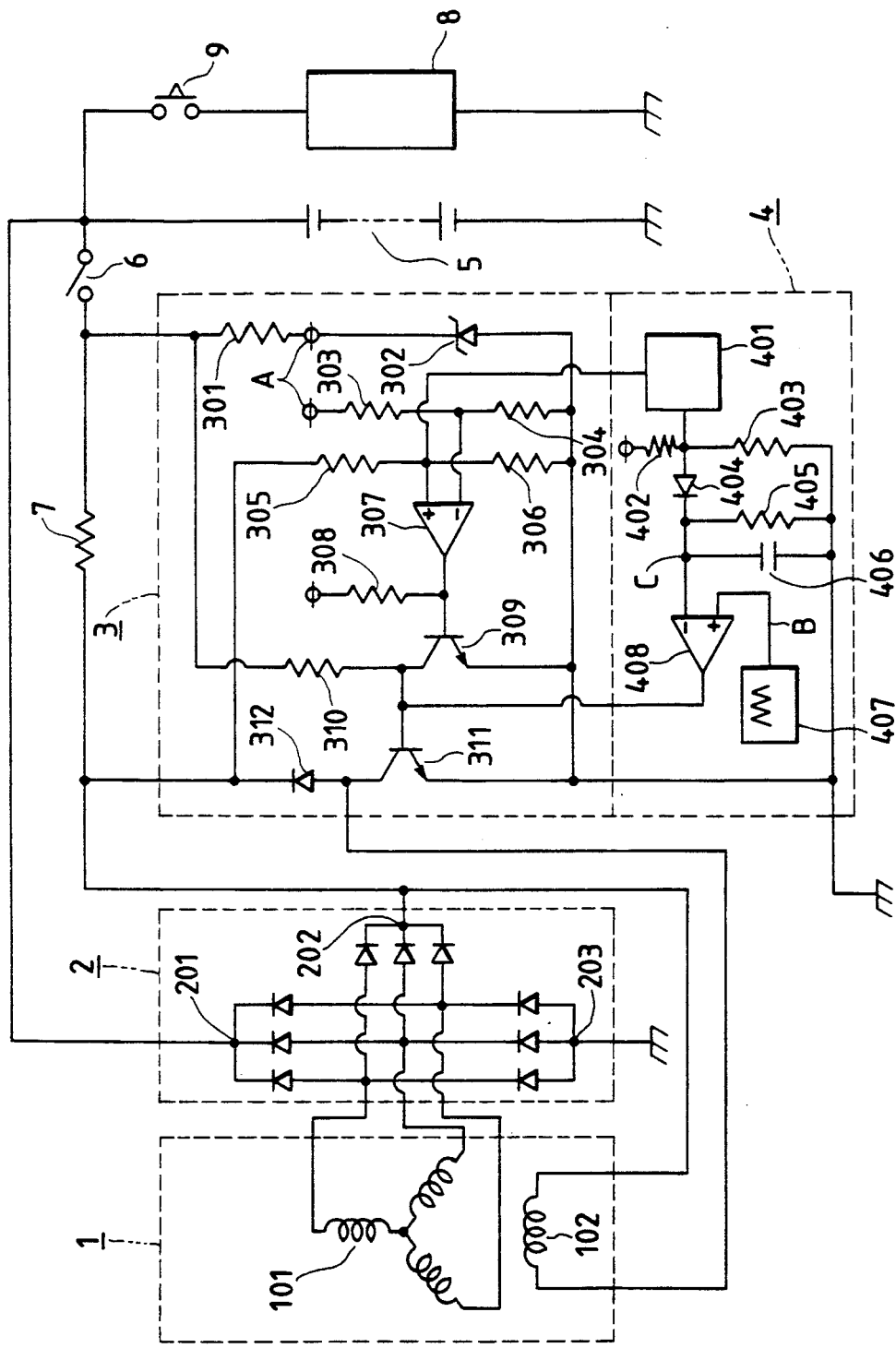
FIG. 1 is a circuit diagram showing an example of a vehicle AC generator control system according to the present invention.

As shown in FIG. 1, an AC generator 1 has an armature coil 101 and a field coil 102, and is connected to a rectifier 2. The rectifier 2 has a main output terminal 201, an auxiliary output terminal 202, and a grounding terminal 203. Furthermore, a voltage regulator 3 is provided which comprises: a constant voltage source A including a resistor 301 and a Zener diode 302; a reference voltage circuit including voltage dividing resistors 303 and 304 for dividing the voltage of the constant voltage source A to provide a reference voltage; voltage dividing resistors 305 and 306 for detecting a generator output voltage; a comparator 307 for comparing a generator output voltage with the reference voltage; a control transistor 309 whose base is connected to the output terminal of the comparator 307 and through a resistor 309 to the constant voltage source A; a power transistor 311 to which a base current is applied through a resistor 310, the power transistor 311 being turned on and off by the control transistor 309; and a suppression diode 312 connected in parallel to the field coil to absorb surge current. In addition, a field current controller 4 is provided which comprises: a timer 401 connected to the voltage dividing resistors 305 and 306 which detect a generator output voltage, the timer 401 being started upon detection of the generator output; a reference voltage circuit including voltage dividing resistors 402 and 403; a diode 404; a time constant circuit including a resistor 405 and a capacitor 406; a triangular wave generator 407 for generating a triangular wave having a predetermined period; and a comparator 408 for comparing the voltage at the circuit point B in FIG. 1 which is the output triangular wave signal of the triangular wave generator 407 with the voltage at the circuit point C in FIG. 1 which is the output signal of the time constant circuit. The output terminal of the field current controller 4 is connected to the base of the power transistor 311 in the voltage regulator 3.

The main output terminal 201 and the auxiliary output terminal 202 of the rectifier 2 are connected to a battery 5. One end of the field coil 102 is connected through a key switch 6 to the battery 5, and the other end is connected to the voltage regulator 3.

In the voltage regulator 3, for the purpose of charging the battery 5 and supplying current to a load 8, the comparator 307 compares a generator output voltage with the reference voltage so that the generated voltage reaches a predetermined value. In the field current controller 4, the timer 401, after detecting the start of power generation of the generator, outputs a high level signal for a period of time $T_1$ (FIG. 2), and a low level signal thereafter.

The generated voltage, controlled according to the result of comparison of the voltage at the circuit point C (hereinafter referred to as "a point C voltage", when applicable) which is determined by the voltage dividing resistors 402 and 403 with the voltage at the circuit point B (hereinafter referred to as "a point B voltage", when applicable) which is the triangular wave signal, is so set as to be lower than the battery voltage. In addition, the paint C voltage is set so that it is lowered by the time constant circuit consisting of the capacitor 406 and the resistor 405 to a predetermined level in a predetermined period of time $T_2$ as indicated by the broken line in FIG. 2(a).

The operation of the above-described embodiment will be described.

When the key switch 6 is turned on, the generator 1 has not started its power generation yet, and therefore the output of the comparator 307 in the voltage regulator 3 is at low level, and the output of the timer 401 in the field current controller 4 is also at low level. Hence, the output of the comparator 408 in the field current controller 4 is at high level, so that the power transistor 311 is rendered conductive (on) to allow an initial exciting current to flow in the field coil 102 through an initial exciting resistor 7. When the generator 1 starts power generation by being driven by the engine, the output of the timer 401 is raised to high level, so that a time measuring operation is carried out. For the predetermined period of time $T_1$ that the timer 401 is in operation, the point C voltage is at the level set by the voltage dividing resistors 402 and 403.

Figure 2A:
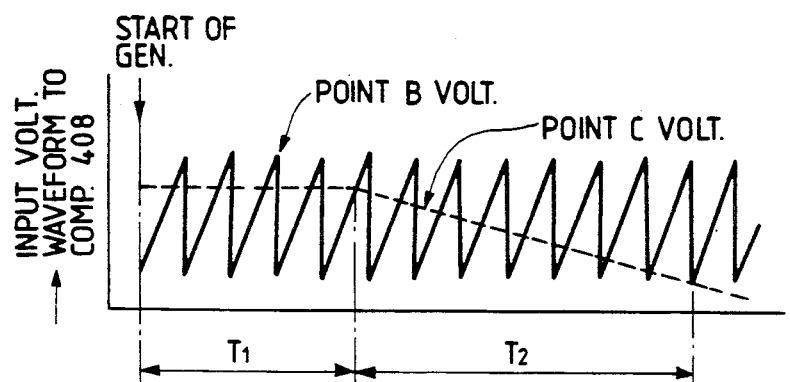
FIGS. 2(a) to 2(c) are graphical representations for a description of the operation of the control device.
Figure 2B:
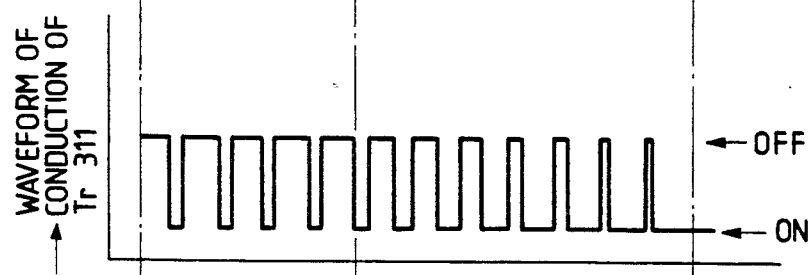
Figure 2C:
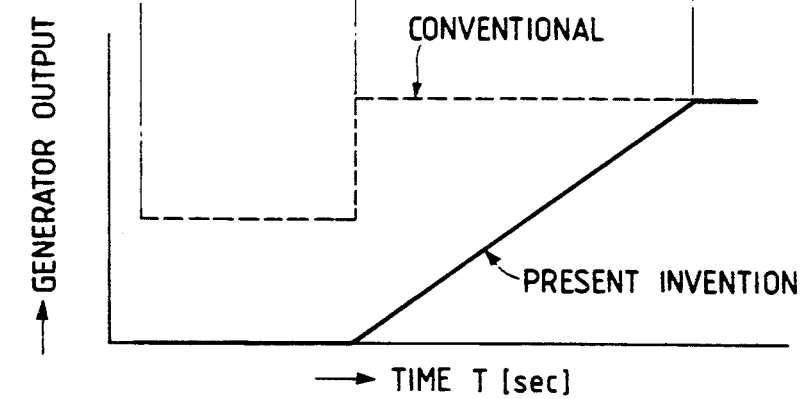

The level thus set relates to the triangular wave signal at the circuit point B as indicated in FIG. 2(a). These values are subjected to comparison by the comparator 408 in the field current controller 4, and in response to the result of the comparison the power transistor 311 is rendered on and off as shown in FIG. 2(b). In this operation, the percentage of conduction of the power transistor is minimum, and in this case the generated voltage is not higher than the battery voltage. Hence, the output of the generator 1 is zero (0) for the predetermined period of time $T_1$ as shown in FIG. 2(c).

When the output of the timer 401 is set to low level in the predetermined period of time $T_1$, the point C voltage is decreased to a predetermined level over the time $T_2$ determined by the time constant circuit consisting of the capacitor 406 and the resistor 405 as shown in FIG. 2(a). In this operation, the waveform of conduction of the power transistor 311 operating in response to the result of comparison by the comparator 408 is as shown in FIG. 2(b). That is, the percentage of conduction of the power transistor 311 is gradually increased, and reaches the maximum value 100% at the end of the predetermined period of time $T_2$. During the period of time $T_2$, the output of the generator is gradually increased from 0% to 100% as indicated by the solid line in FIG. 2(c). Thereafter, control is carried out according to the output of the comparator 307 in the voltage regulator 3. In FIG. 2(c), the solid and dotted line indicate the difference in generator output as between the conventional control device.

With the control device according to the invention, for a predetermined period of time from the start of power generation by the AC generator immediately after the start of the engine the generated voltage is set lower than the battery voltage so that the generator provides no output. Hence, the generator drive load torque can be completely eliminated to quickly stabilize the engine idling rotation. In addition, the production of a belt slip noise can be prevented at low temperatures. Furthermore, with the control device, the percentage of conduction of the switching element is gradually increased over the predetermined period of time, and therefore the engine load will not be abruptly increased. Accordingly, the production of belt slip noises and the reduction of the speed of rotation of the engine can be positively prevented which otherwise take place when the generator output is restored.

Figure 3:
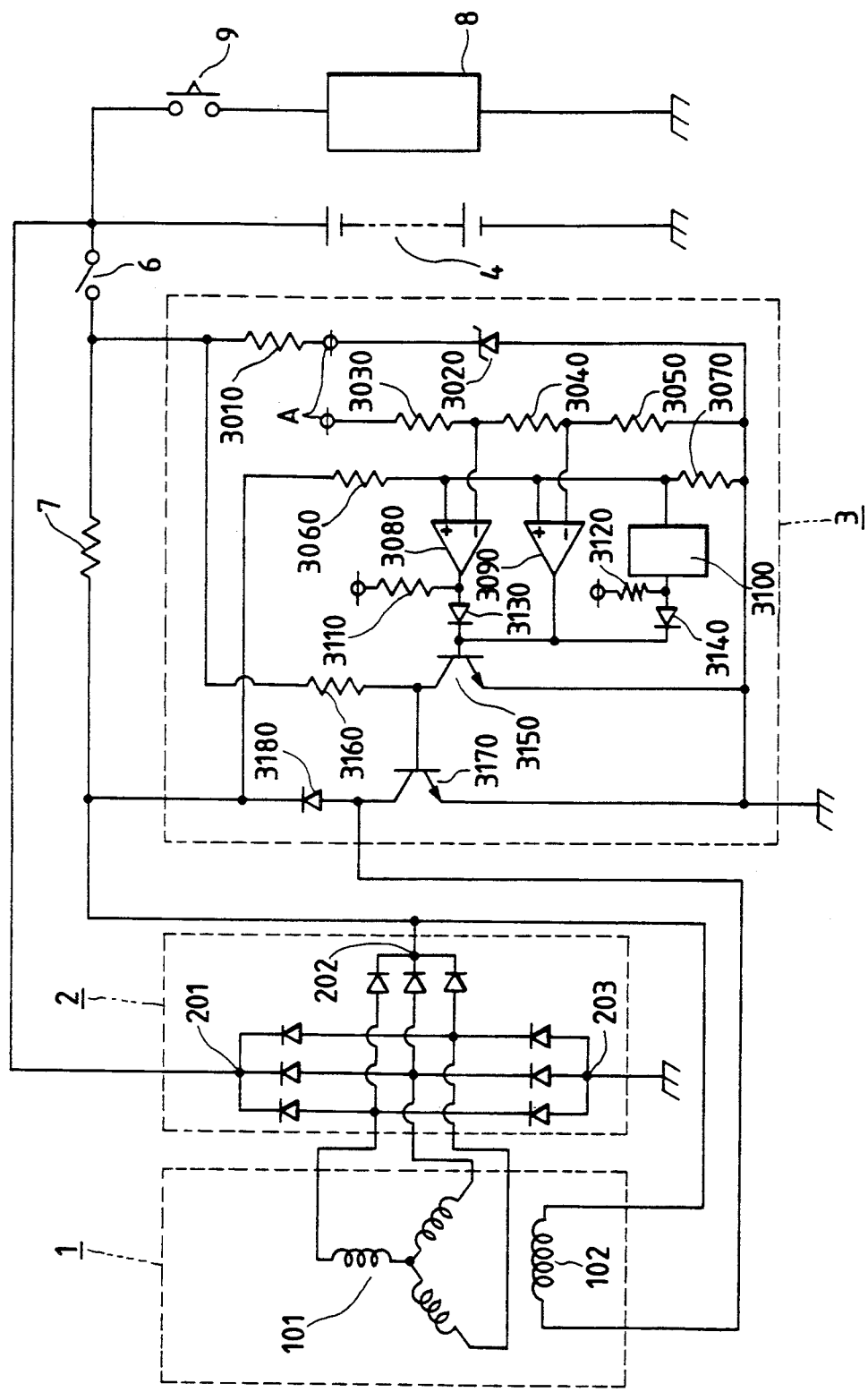
FIG. 3 is a circuit diagram showing another example of a vehicle AC generator control system according to the present invention.

Another embodiment of the present invention will be described with reference to FIG. 3.

The field coil 102 is connected to a voltage regulator 3 which controls the field current thereby to control the output voltage of the AC generator.

The voltage regulator 3 comprises: a constant voltage source A including a resistor 3010 and a Zener diode 3020; a reference voltage circuit including voltage dividing resistors 3030, 3040 and 3050 for dividing the output of the constant voltage source A to provide first and second reference voltages; voltage dividing resistors 3060 and 3070 for detecting an output voltage of the generator; a first comparator 3080 for comparing a generator output voltage with the first reference voltage provided by the reference voltage circuit; a second comparator 3090 for comparing a generator output voltage with the second reference voltage provided by the reference voltage circuit; a timer 3100 connected to the voltage dividing resistors 3060 and 3070, the timer 3100 being started upon detection of a predetermined output voltage; resistors 3110 and 3120 connected to the constant voltage source A; a control transistor 3150 whose base is connected through a diode 3130 to the resistor 3110 (connected to the constant voltage source A) and the output terminal of the first comparator 3080, and connected to the output terminal of the second comparator 3090, and connected through a diode 3140 to the resistor 3120 (connected to the constant voltage source A) and the output terminal of the timer 3100; a power transistor 3170 to which a base current is applied through a resistor 3160, the power transistor 3170 being controlled by the control transistor; and a suppression diode 3180 connected in parallel to the field coil 102, to absorb surge current.

The main output terminal 201 and the auxiliary output terminal 202 of the rectifier 2 are connected to a battery 4. One end of the field coil 102 is connected through an initial exciting resistor 7 and a key switch 6 to the battery 4, and the other end is connected to the voltage regulator 3. A vehicle electrical load 8 is connected through a load switch 9 to the battery 4.

For convenience in description, it is assumed that the vehicle AC generator is of 12 V. The battery voltage is 12 V. The second comparator 3090 determines whether or not the generator output voltage reaches a first predetermined value such as 10 V, while the first comparator 3080 determines whether or not the generator output voltage reaches a second predetermined value such as 14 V. The timer 3100 is started when the generator output voltage reaches, for instance, 8 V, the timer 3100 is started to output a high level signal for a predetermined period of time, for instance ten (10) seconds, and a low level signal thereafter.

The operation of the control device thus organized will be described.

When the key switch 7 is turned on, the generator 1 has not been started yet, and therefore the outputs of the first and second comparators 3080 and 3090 are at low level, and the output of the timer 3100 is also at low level. Accordingly, in this case, the control transistor 3150 is non-conductive (off), an therefore the power transistor 3170 is conductive (on). Hence, an initial exciting current flows in the field coil 102 through the initial exciting resistor 7.

Soon thereafter the generator 1 starts power generation by being driven by the engine. When the generated voltage exceeds 8 V, the output of the timer 3100 is raised to high level, thus starting the measurement of time. When the generated voltage exceeds 10 V during ten (ten) seconds for which the timer 3100 is in operation, the output of the second comparator 3090 is raise to high level. As a result, the control transistor 3150 is rendered conductive (on), and therefore the power transistor 3170 is rendered non-conductive (off), thereby to prevent the rise of the output voltage. When, in contrast, the generated voltage becomes lower than 10 V, the output of the second comparator 3090 is set to low level. As a result, the control transistor 3150 is rendered non-conductive (off), and accordingly the power transistor 3170 is rendered conductive (on), thus preventing the fall of the output voltage. Thus, the generator output voltage is maintained at 10 V for the ten seconds the timer 3100 is in operation.

When the operation of the timer 3100 is ended; that is, in the ten seconds, the output of the timer 3100 is set to low level, so that the control transistor 3150 is rendered non-conductive (off) and the power transistor 3170 is rendered conductive (on). As a result, the exciting current is increased, and the generated voltage is also increased. When the generated voltage exceeds 14 V, then the output of the first comparator 3080 is raised to high level, as a result of which the control transistor 3150 is rendered conductive, therefore the power transistor 3170 is rendered non-conductive, thus suppressing the field current to prevent the rise of the generated voltage. When, in contrast, the generated voltage becomes lower than 14 V, then output of the first comparator 3080 is set to low level. As a result, the control transistor 3150 is rendered non-conductive, and therefore the power transistor 3170 is rendered conductive, thus increasing the field current to prevent the fall of the output voltage. Thus, the generated voltage is maintained at 14 V.

As is apparent from the above description, with the control device of the invention, the generated voltage is adjusted to 10 V which is lower than the battery voltage for ten seconds from the start of power generation by the generator, so that, the generator 1 provides no output. When ten seconds passes after the start of power generation, the generated voltage is adjusted to 14 V which is higher than the battery voltage, so that the usual charge output operation is carried out.

In the above-described control device, the operating time of the timer 3100 is ten seconds; however, the invention is not limited thereto or thereby. That is, the operating time may be set to other values as the case may be.

It goes without saying that the technical concept of the invention is applicable to vehicle generators of other than 12 V.

Accordingly, the generator drive load torque can be completely eliminated, to quickly stabilize the engine idling rotation.

The complete elimination of the generator drive load torque allows the belt to sufficiently engage with the pulleys, whereby the production of belt slip noises is positively prevented.

While there has been described in connection with the preferred embodiment of the invention, it will be obvious to those skilled in the art that various changes and modifications may be made therein without departing from the invention. It is aimed, therefore, to cover in the appended claims all such changes and modifications as fall within the true spirit and scope of the invention.

What is claimed is:

1. A vehicle AC generator control system for a vehicle having an engine, said system comprising:
   an AC generator having a field coil and a drive torque load;
   a rectifier for rectifying an AC output of said AC generator;
   a battery connected to the output terminals of said rectifier; and
   a voltage regulator having a switching element connected in series to said field coil;
   said voltage regulator comprising:
   means for detecting the terminal voltage of either said rectifier or battery to detect start-up of the engine;
   means for measuring a predetermined period of time after start-up of the engine; and
   control means for controlling a field current with the aid of said switching element to adjust an output voltage of said AC generator to a predetermined value, wherein the predetermined value is a first positive value lower than a voltage appearing across said battery during the predetermined period of time after start-up of the engine and then to a second positive value higher than the voltage appearing across said battery after the predetermined period of time has elapsed, whereby the drive torque load of said AC generator is eliminated for the predetermined period of time after start-up of the engine is detected.

2. The system as defined in claim 1 wherein said voltage regulator operates to control said switching element so as to have a first conduction rate for the predetermined period of time,
and then to control said switching element so as to have a conduction rate gradually increasing from the first conduction rate to a second conduction rate.

3. The system as defined in claim 1 wherein said voltage regulator operates to adjust the output voltage of said AC generator to 10 V for ten seconds from the start-up of the engine, and then to adjust to 14 V after ten seconds have elapsed.

4. The system as defined in claim 2 wherein said voltage regulator operates to control said switching element so as to have the first conduction rate for ten seconds from the start-up of the engine, and then to control said switching element so as to have a conduction rate gradually increasing from the first conduction rate to the second conduction rate.

5. A vehicle AC generator control system for a vehicle having an engine, said system comprising:
an AC generator having a field coil and a drive torque load;
a rectifier for rectifying an AC output of said AC generator;
a battery connected to the output terminals of said rectifier; and
a voltage regulator having a switching element connected in series to said field coil;
said voltage regulator detecting the terminal voltage of either said rectifier or battery to detect start-up of the engine and to control a field current with the aid of said switching element to adjust an output voltage of said AC generator to a predetermined value, wherein the predetermined value is a first positive value lower than a voltage appearing across said battery during a predetermined period of time after start-up of the engine and then to a second positive value higher than the voltage appearing across said battery after the predetermined period of time has elapsed, whereby the drive torque load of said AC generator is eliminated for the predetermined period of time after start-up of the engine is detected;
wherein said voltage regulator comprises a field current controller for producing a control signal for said switching element to control the field current for said AC generator, said field current controller including at least:
a timer circuit for detecting elapse of the predetermined period of time;
a reference voltage circuit for providing a reference voltage which is a constant positive voltage for the predetermined period of time and thereafter gradually decreases;
a triangular wave generator for outputting a triangular wave signal; and
a comparator for comparing the triangular wave signal and the reference voltage to output the control signal.

6. The system as defined in claim 5 wherein said reference voltage circuit comprises a time constant circuit for causing the reference voltage to gradually decrease after the elapse of the predetermined period of time.

7. A vehicle AC generator control system for a vehicle having an engine, said system comprising:
an AC generator having a field coil and a drive torque load;
a rectifier for rectifying an AC output of said AC generator to produce an output voltage of said AC generator;
a battery connected to the output terminals of said rectifier; and
a voltage regulator having a switching element connected in series to said field coil;
said voltage regulator detecting the output voltage of said AC generator to detect start-up of the engine and to control a field current with the aid of said switching element to adjust an output voltage of said AC generator to a predetermined value, wherein the predetermined value is a first positive value lower than a voltage appearing across said battery during a predetermined period of time after start-up of the engine and then to a second positive value higher than the voltage appearing across said battery after the predetermined period of time has elapsed, whereby the drive torque load of said AC generator is eliminated for the predetermined period of time after start-up of the engine is detected;
wherein said voltage regulator produces a control signal for said switching element to control the field current for said AC generator, and said voltage regulator including at least:
a reference voltage circuit for providing the first and second positive values;
a timer circuit for detecting elapse of the predetermined period of time;
a first comparator for comparing the second positive values with the output voltage of said AC generator to output a first control signal; and
a second comparator for comparing the first positive value with the output voltage of said AC generator to output a second control signal.

8. The system as defined in claim 7 wherein said timer circuit measures the predetermined period of time after start-up of the engine is detected.

9. The system as defined in claim 7 wherein the first control signal controls the field current such that the output voltage of said AC generator is maintained at the second positive value after the predetermined period of time.

10. The system as defined in claim 9 wherein the second control signal controls the field current such that the output voltage of said AC generator is maintained at the first positive value during the predetermined period of time.

11. The system as defined in claim 10 wherein said timer circuit measures the predetermined period of time after start-up of the engine is detected.

* * * * *